United States Patent [19]
Bjelland

[11] Patent Number: 5,228,005
[45] Date of Patent: Jul. 13, 1993

[54] DEVICE FOR USE IN A SEISMIC STREAMER

[75] Inventor: Cato Bjelland, Isdalsto, Norway

[73] Assignee: Geco A.S., Stavanger, Norway

[21] Appl. No.: 863,984

[22] Filed: Apr. 6, 1992

[30] Foreign Application Priority Data

Apr. 9, 1991 [NO] Norway ............................... 911376

[51] Int. Cl.⁵ .............................................. G01V 1/38
[52] U.S. Cl. ........................................ 367/15; 367/20; 367/154; 114/244
[58] Field of Search ...................... 367/20, 15, 16, 17, 367/106, 130, 154; 114/242, 244, 245, 253

[56] References Cited

U.S. PATENT DOCUMENTS 3,884,173  5/1975  Fabula .................................. 114/235
4,984,218  1/1991  Ritter et al. ........................... 367/15

Primary Examiner—J. Woodrow Eldred
Attorney, Agent, or Firm—Jacobson, Price, Holman & Stern

[57] ABSTRACT

Seismic streamers (detection cables) used in the reception of reflection signals during seismic surveys at sea, where the streamer is towed behind a vessel, are constructed with an external, tubular cover (1) of a flexible plastic material. In order to reduce the noise produced by movement of the streamer through the water the external cover (1) is constructed with continuous longitudinally extending grooves (3) in its longitudinal direction, and preferably regularly disposed circumferentially around the entire periphery of the cover (1).

13 Claims, 1 Drawing Sheet

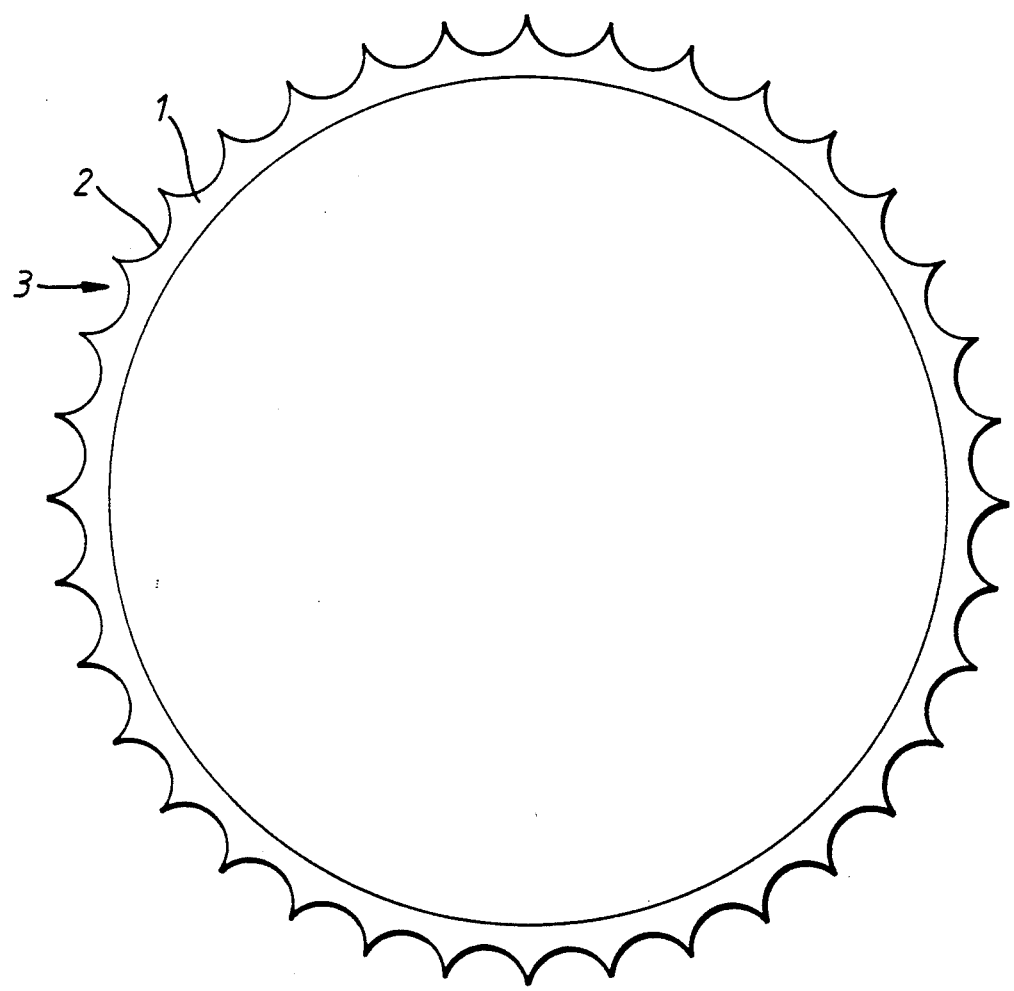

DEVICE FOR USE IN A SEISMIC STREAMER

BACKGROUND OF THE INVENTION

The invention concerns a device for a seismic streamer for use in the reception of reflection signals during seismic surveys at sea, where the streamer is towed behind a vessel and where the streamer is constructed with an external, tubular cover of a flexible plastic material.

When seismic surveys are conducted at sea, an array of normally parallel seismic energy sources, such as air guns are towed behind the vessel to transmit seismic signals which are reflected from the seabed, the reflected signals then being received by seismic detection cables, so-called streamers which contain hydrophones which record the signals and convey them back to the seismic vessel. These streamer cables will naturally be highly dependent on receiving signals which are really the reflected signals, and that these signals are the dominant signals received by the hydrophones. There are many problems which arise in this connection for a variety of reasons, some due to the cable itself and others to the environment. Objects in the water or in the surrounding area can cause a distortion of the signals received by the streamer cable's hydrophones. Some of the noise can also be generated by vibrations from the towing or from waves in the sea.

One of the problems which is particularly prevalent is that the streamer cable itself generates noise when it is towed through the water, this being due to the friction of the cable's skin or cover in the water. Many studies have been made of this type of noise from a vessel moving through the water, especially in connection with submarines which have to proceed as silently as possible, but in other contexts too, research has been carried out with regard to the surface of vessels with a view to reducing not only noise, but also surface friction. The most common theory has been that the surface should be made as smooth as possible in order to prevent friction, but theories have also been advanced that grooves should be made in the ship's surface in order to provide stability in the water and grooved surfaces have also proved to generate less noise.

BRIEF SUMMARY OF THE INVENTION

The object of the present invention is to improve the noise situation in connection with seismic streamers, where the noise from the streamer cable's own progress through the water causes a problem and for a long time there has been a desire to reduce this type of noise as much as possible in order to obtain better recording results from the seismic survey.

This is achieved by a device of the type described in the introduction, which is characterized by the features described hereinafter.

During seismic surveys at sea the pulses from the seismic energy sources are received by long cables equipped with hydrophones which are towed behind the seismic vessel. These cables can be 3 kilometers long and two such cables are normally used towed at a controlled distance from each other behind the vessel.

During the towing and due to the movement of the sea, vibrations will be caused in the cables, which are normally composed of 100 m long sections. The hydrophones in the streamer sections are installed in an oil-filled casing and load-absorbing wires and distance pieces build up an internal skeleton. The hydrophones are given a directive design and connected to coupling elements at each end of the respective streamer sections. Vibrations in the load wires, however, will affect both the couplings and the oil-filled casing. Bow waves are created at the front end of the cable, causing further effects. Such extra pressure variations are detected by the hydrophones and will be added to the recorded seismic signals.

Moreover, the boundary layer turbulence when the streamer moves through the water will cause pressure variations on the outer skin or the streamer cable skin. Thus the current noise which is detected by the hydrophones has two main causes, viz. direct conveyance of pressure variations from turbulent layers and from bow waves.

According to the invention the streamer cable's external cover or skin is constructed with grooves extending in the longitudinal direction. It has been shown that with this kind of design of the streamer cable's external skin, a stable passage through the water is achieved and cable noise is also reduced to a considerable extent. Even though the effects of grooving have been studied previously, it has not been natural to transfer this to a flexible cable or a flexible cover, since such a cable when towed will bend slightly and follow movements in the water and it has therefore been assumed that the ideal solution must be to have as smooth a surface as possible. Surprisingly enough, it has now been shown that a grooving even on a body with as small a diameter as a streamer cable gives definite improvements in the area of noise problems.

BRIEF DESCRIPTION OF THE DRAWING

The invention will now be described in detail reference to the accompanying drawing which shows a section through a streamer cable and illustrates the grooved construction of the external cover.

DETAILED DESCRIPTION

In the illustration of the streamer cable only the external cover is shown, since the streamer cable's internal construction does not constitute any part of the invention. In the illustrated embodiment the grooves in the streamer cover 1 are constructed as parts of circles 2 and these grooves which are generally designated by 3 are regularly arranged around the entire periphery of the streamer cable. In the illustrated embodiment the circular arcs in a groove are constructed in such a way that they immediately carry over into the circular arc of the next groove.

It has been discovered that particularly favorable results are achieved if the maximum depth of the groove constitutes half of the width of the groove. In a standard streamer cable it is advantageous to use grooves 6 mm wide.

Many modifications will be possible within the scope of the invention and other profile designs of the grooves could also be considered.

I claim:

1. A device for longitudinal seismic streamers for use in the reception of reflection signals during seismic surveys at sea, where the streamer is towed behind a vessel and has an external, tubular cover of a flexible plastic material, comprising:

a plurality of continuous longitudinal grooves in said cover extending in the longitudinal direction of said cover, said grooves being circumferentially disposed regularly around the entire periphery of said cover and comprising longitudinally extending surfaces each having a cross-sectional shape in the form of a segment of a circle.

2. The device as claimed in claim 1, wherein:
said grooves further comprise concave longitudinal smooth surfaces in the outer periphery of said cover.

3. The device as claimed in claim 1, wherein:
said cross sectional shape of each groove comprises a circular arc; and
said circular arc of each groove merges with said circular arcs of adjacent grooves.

4. The device as claimed in claim 2, wherein:
said cross sectional shape of each groove comprises a circular arc; and
said circular arc of each groove merges with said circular arcs of adjacent grooves.

5. A device as claimed in claim 1, wherein:
each groove has a maximum depth of substantially one-half the width of the groove.

6. A device as claimed in claim 2, wherein:
each groove has a maximum depth of substantially one-half the width of the groove.

7. A device as claimed in claim 3, wherein:
each groove has a maximum depth of substantially one-half the width of the groove.

8. A device as claimed in claim 4, wherein:
each groove has a maximum depth of substantially one-half the width of the groove.

9. A device as claimed in claim 5, wherein:
said width of each groove is approximately 6 mm.

10. A device as claimed in claim 6, wherein:
said width of each groove is approximately 6 mm.

11. A device as claimed in claim 7, wherein:
said width of each groove is approximately 6 mm.

12. A device as claimed in claim 8, wherein:
said width of each groove is approximately 6 mm.

13. A device for longitudinal seismic streamers for use in the reception of reflection signals during seismic surveys at sea, where the streamer is towed behind a vessel and has an external, tubular cover of flexible plastic material, comprising:
a plurality of continuous longitudinal grooves in said cover extending in the longitudinal direction of said cover, said grooves comprising longitudinally extending surfaces each having a cross-sectional shape in the form of a circular arc, said circular arc of each groove immediately carrying over into said circular arcs of adjacent grooves.

* * * * *